US009509536B2

(12) United States Patent
Honda

(10) Patent No.: US 9,509,536 B2
(45) Date of Patent: Nov. 29, 2016

(54) COMMUNICATION APPARATUS, CIRCUIT FOR COMMUNICATION APPARATUS, AND COMMUNICATION METHOD

(75) Inventor: Mitsuhiro Honda, Tokyo (JP)

(73) Assignee: NEC Corporation, Tokyo (JP)

( * ) Notice: Subject to any disclaimer, the term of this patent is extended or adjusted under 35 U.S.C. 154(b) by 324 days.

(21) Appl. No.: 13/881,497

(22) PCT Filed: Nov. 24, 2011

(86) PCT No.: PCT/JP2011/077078
§ 371 (c)(1),
(2), (4) Date: Apr. 25, 2013

(87) PCT Pub. No.: WO2012/070624
PCT Pub. Date: May 31, 2012

(65) Prior Publication Data
US 2013/0215763 A1  Aug. 22, 2013

(30) Foreign Application Priority Data
Nov. 26, 2010 (JP) .................................. 2010-263437

(51) Int. Cl.
| H04L 27/00 | (2006.01) |
| H04L 1/00 | (2006.01) |
| H04L 1/20 | (2006.01) |
| H04L 1/06 | (2006.01) |

(52) U.S. Cl.
CPC ......... *H04L 27/0008* (2013.01); *H04L 1/0003* (2013.01); *H04L 1/06* (2013.01); *H04L 1/20* (2013.01); *H04L 27/0012* (2013.01); *H04L 2001/0096* (2013.01)

(58) Field of Classification Search
None
See application file for complete search history.

(56) References Cited

U.S. PATENT DOCUMENTS

2004/0235508 A1* 11/2004 Uchida ................ H04B 7/2659
455/509
2010/0279614 A1* 11/2010 Hagiwara et al. .............. 455/42

FOREIGN PATENT DOCUMENTS

| JP | 2006-238314 A | 9/2006 |
| JP | 2006-270223 A | 10/2006 |
| JP | 2008-35183 A | 2/2008 |
| JP | 2009-171263 A | 7/2009 |
| JP | 2009-171421 A | 7/2009 |
| JP | 2010-154016 A | 7/2010 |
| WO | WO 2010/095566 A1 | 8/2010 |

* cited by examiner

Primary Examiner — Vinncelas Louis
(74) Attorney, Agent, or Firm — Foley & Lardner LLP

(57) ABSTRACT

In a communication apparatus which performs wireless communication over a plurality of lines, a reduction in transmission efficiency is prevented from occurring. A communication apparatus is provided with: a plurality of reception units which receive signals of the same content from an opposed station over a plurality of lines using wireless communication; a quality determination unit which determines qualities of the plurality of lines based on the received signals of the same content; a modulation scheme determination unit which determines a modulation scheme to be used for the wireless communication based on the quality of only a line over which communication is possible when it becomes impossible to perform communication over a line among the plurality of lines; and a transmission unit which transmits information indicating the determined modulation scheme to the opposed station.

26 Claims, 6 Drawing Sheets

COMMUNICATION APPARATUS, CIRCUIT FOR COMMUNICATION APPARATUS, AND COMMUNICATION METHOD

This application is the National Phase of PCT/JP2011/077078, filed Nov. 24, 2011, which claims priority to Japanese Application No. 2010-263437, filed Nov. 26, 2010, the disclosures of which are hereby incorporated by reference in their entirety.

TECHNICAL FIELD

The present invention relates to a technology which switches a modulation scheme in accordance with an adaptive modulation method.

BACKGROUND ART

In adaptive modulation methods used in wireless communication, a modulation scheme of a modulator in a transmitting station and a modulation scheme of a demodulator in a receiving station are sequentially switched in accordance with modulation scheme information transmitted from the transmitting station to match the modulation schemes (more strictly speaking, with respect to the demodulator in the receiving station, a demodulation scheme corresponding to the modulation scheme of the modulator in the transmitting station; this is also applied to the following description) with each other, and communication is performed. As a result of such a process, the modulation scheme of a transmission line is switched without an instantaneous interruption. However, if a wireless line is interrupted (if a line disconnection has occurred due to, for example, bad weather), the modulation scheme information from the transmitting station does not arrive at the receiving station. For this reason, it is difficult to match the modulation scheme of the modulator in the transmitting station with the modulation scheme of the demodulator in the receiving station. For this reason, in adaptive modulation methods relating to the present invention, it is common to make the modulation scheme of the modulator in the transmitting station and the modulation scheme of the demodulator in the receiving station the same modulation scheme that provides the smallest number of levels. This is because the modulation scheme that provides the smallest number of levels is tolerant to deteriorations of lines. As a result of such control, the above-described adaptive modulation methods make it easy to perform restoration from a disconnection of a wireless line.

Moreover, an apparatus which improves the transmission quality by providing a plurality of lines from a transmitting station to a receiving station has been proposed (see Patent Document 1). The transmitting station disclosed in Patent Document 1 transmits, over the plurality of lines, a signal that has been obtained by copying data to be transmitted and modulating the resultant data with the same modulation scheme. The receiving station selects a line providing the high quality from among the plurality of lines and adopts signals received from the line.

Prior Art Document

Patent Document

Patent Document 1: Japanese Unexamined Patent Application, First Publication No. 2009-171263

SUMMARY OF INVENTION

Problems to be solved by the Invention

As described above, it is common to make the modulation scheme of the modulator in the transmitting station and the modulation scheme of the demodulator in the receiving station the same modulation scheme that provides the smallest number of levels if a line disconnection has occurred. When such control is adopted in the technology disclosed in Patent Document 1, there is a problem in that the modulation scheme of a line in which a line disconnection has occurred is switched to a modulation scheme that provides the smallest number of levels, so that the modulation scheme of a line in which no line disconnection has occurred is also made the same modulation scheme that provides the smallest number of levels, thereby reducing the transmission efficiency.

In view of the above-described circumstances, an exemplary object of the present invention is to provide a technology that prevents the transmission efficiency in a communication apparatus that performs wireless communication over a plurality of lines from being reduced.

Means for Solving the Problems

An aspect of the present invention is a communication apparatus which includes: a plurality of reception units which receive signals of the same content from an opposed station over a plurality of lines using wireless communication; a quality determination unit which determines qualities of the plurality of lines based on the received signals of the same content; a modulation scheme determination unit which determines a modulation scheme to be used for the wireless communication based on the quality of only a line over which communication is possible when it becomes impossible to perform communication over a line among the plurality of lines; and a transmission unit which transmits information indicating the determined modulation scheme to the opposed station.

An aspect of the present invention is a circuit for a communication apparatus, and the circuit includes: a quality determination unit which determines qualities of a plurality of lines from signals of the same content that have been received over the plurality of lines using wireless communication; a line disconnection detection unit which detects a line disconnection for each of the plurality of lines; and a modulation scheme determination unit which, when the line disconnection has been detected in a line among the plurality of lines, determines a modulation scheme to be used for the wireless communication based on the quality of a line other than the line in which the line disconnection has been detected.

An aspect of the present invention is a communication method which includes: receiving signals of the same content from an opposed station over a plurality of lines using wireless communication; determining qualities of the plurality of lines based on the received signals of the same content; determining a modulation scheme to be used for the wireless communication based on the quality of only a line over which communication is possible when communication over a line among the plurality of lines is impossible; and transmitting information indicating the determined modulation scheme to the opposed station.

Exemplary Advantageous Effects of the Invention

The present invention can prevent the transmission efficiency in a communication apparatus that performs wireless communication over a plurality of lines from being reduced.

MODES FOR CARRYING OUT THE INVENTION

Figure 1:
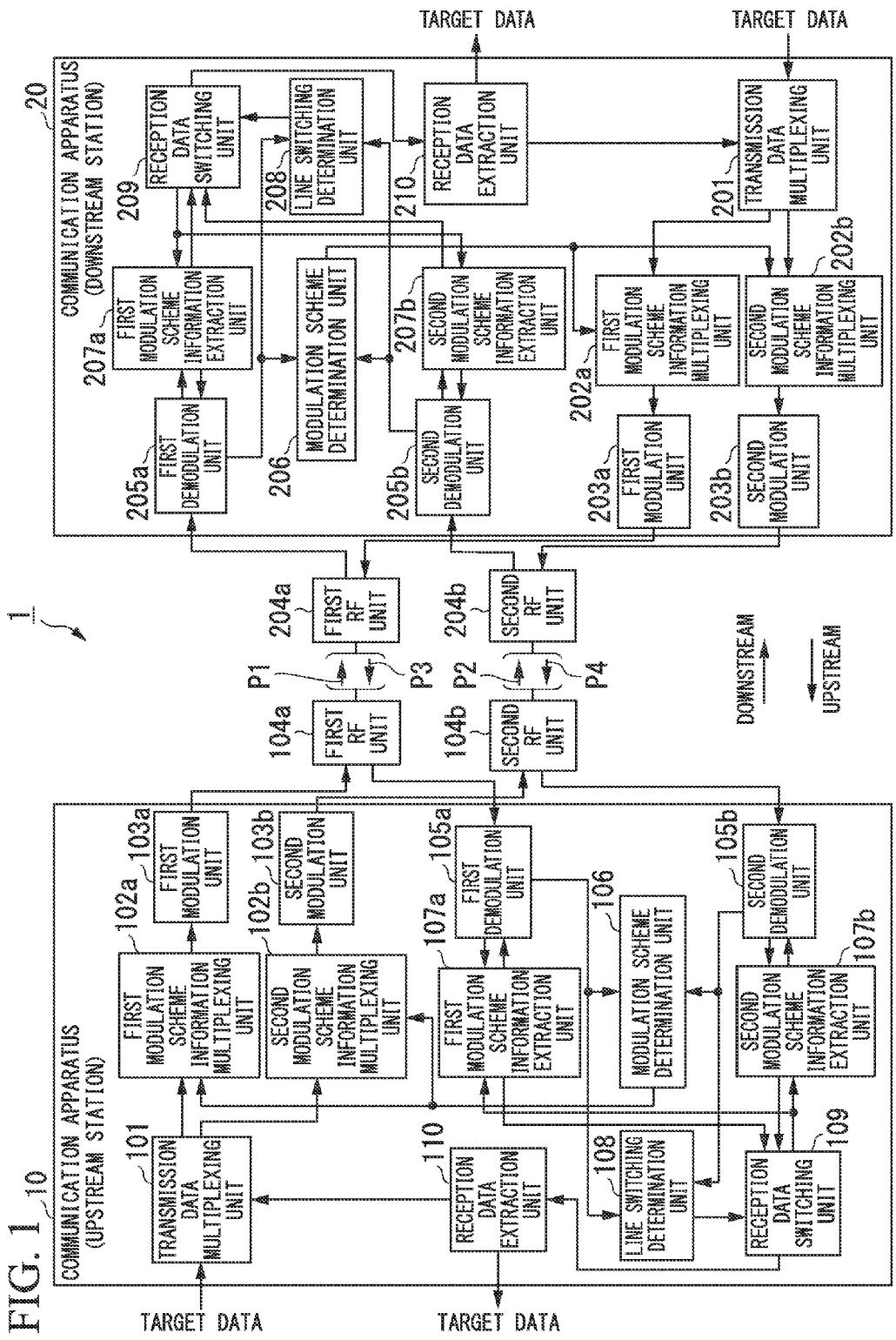
FIG. 1 is a system configuration diagram illustrating a system configuration of a communication system.

FIG. 1 is a system configuration diagram illustrating a system configuration of a communication system 1. The communication system 1 is provided with a plurality of opposed communication apparatuses. In the case of FIG. 1, the communication system 1 is provided with a communication apparatus 10 and a communication apparatus 20. The communication apparatus 10 has basically the same configuration as that of the communication apparatus 20.

The communication apparatus 10 transmits data of the same content to the communication apparatus 20 over a plurality of lines (a line P1 and a line P2). In addition, the communication apparatus 20 transmits data of the same content to the communication apparatus 10 over a plurality of lines (a line P3 and a line P4). When communication over all the lines (the line P1 to the line P4) is possible (when no line disconnection has occurred), the communication apparatus 10 and the communication apparatus 20 determine a modulation scheme based on an adaptive modulation method and perform transmission and reception with the determined modulation scheme. In contrast, if it becomes impossible to perform communication over one of the lines (one of the line P1 to the line P4) (the state in which a line is disconnected), the communication apparatus 10 and the communication apparatus 20 determine a modulation scheme based on only lines over which communication is possible. The state in which a line is disconnected occurs due to, for example, bad weather.

Hereinafter, the details of the communication system 1 will be described. In the following description, the communication apparatus 10 is described as an upstream station and the communication apparatus 20 is described as a downstream station. Thus, communication in which transmission is performed from the communication apparatus 10 to the communication apparatus 20 is called downstream communication, and communication in which transmission is performed from the communication apparatus 20 to the communication apparatus 10 is called upstream communication.

The communication apparatus 10 is provided with a transmission data multiplexing unit 101, a first modulation scheme information multiplexing unit 102a, a second modulation scheme information multiplexing unit 102b, a first modulation unit 103a, a second modulation unit 103b, a first RF (radio frequency) unit 104a, a second RF unit 104b, a first demodulation unit 105a, a second demodulation unit 105b, a modulation scheme determination unit 106, a first modulation scheme information extraction unit 107a, a second modulation scheme information extraction unit 107b, a line switching determination unit 108, a reception data switching unit 109, and a reception data extraction unit 110. The communication apparatus 20 has basically the same configuration as that of the communication apparatus 10.

The transmission data multiplexing unit 101 accepts an input of data to be transmitted (hereinafter referred to as "target data"). The target data may be data generated in the communication apparatus 10, or it may be data input from another apparatus that is connected to the communication apparatus 10. The transmission data multiplexing unit 101 multiplexes the target data with information representing a modulation scheme to be used in the downstream communication (hereinafter referred to as "downstream modulation scheme information"). The downstream modulation scheme information, which is multiplexed with the target data, is informed from the reception data extraction unit 110. The transmission data multiplexing unit 101 sends data (hereinafter referred to as "transmission data") obtained by multiplexing the target data with the downstream modulation scheme information to the first modulation scheme information multiplexing unit 102a and the second modulation scheme information multiplexing unit 102b.

The first modulation scheme information multiplexing unit 102a, the first modulation unit 103a, and the first RF unit 104a, and the second modulation scheme information multiplexing unit 102b, the second modulation unit 103b, and the second RF unit 104b form separate transmission channels. The transmission channels perform the same process on the transmission data and transmit signals of the same content to the opposed communication apparatus though different lines. Hereinafter, each of the structures that form the transmission channels will be described.

The first modulation scheme information multiplexing unit 102a receives the transmission data from the transmission data multiplexing unit 101 and multiplexes the transmission data with information representing a modulation scheme to be used in the upstream communication (hereinafter referred to as "upstream modulation scheme information"). The upstream modulation scheme information, which is multiplexed with the transmission data, is information determined by the modulation scheme determination unit 106. The first modulation scheme information multiplexing unit 102a sends data obtained by multiplexing the transmission data with the upstream modulation scheme information (hereinafter referred to as "multiplexed transmission data ") to the first modulation unit 103a.

The first modulation unit 103a receives the multiplexed transmission data from the first modulation scheme information multiplexing unit 102a. Moreover, the first modulation unit 103a reads the downstream modulation scheme information, which has been multiplexed by the transmission data multiplexing unit 101. Then, the first modulation unit 103a stores the read downstream modulation scheme information.

Furthermore, the first modulation unit 103a performs a modulation process on the multiplexed transmission data received from the first modulation scheme information multiplexing unit 102a. Subsequently, the first modulation unit 103a embeds synchronization patterns in a signal of modulated multiplexed transmission data at predetermined positions. Then, the first modulation unit 103a sends a signal in which the synchronization patterns are embedded to the first RF unit 104a.

Here, an example of the timing when the first modulation unit 103a switches the modulation scheme will be described. In the present exemplary embodiment, the transmission data multiplexing unit 101 periodically embeds a synchronization pattern in the target data. The synchronization pattern is data (a bit sequence) for establishing synchronization between transmission and reception of the target data. In the following description, data of a section sandwiched by synchronization patterns is referred to as a "frame". Therefore, a synchronization pattern represents a delimiter between frames. The first modulation unit 103a forms one frame using signals modulated with the same modulation scheme. Specifically, it operates as follows. The first modulation unit 103a reads the downstream modulation scheme information from the multiplexed transmission data and stores this information. Then, when multiplexed transmission data that forms the next frame is input from the first modulation scheme information multiplexing unit 102a, the first modulation unit 103a performs a modulation process with the modulation scheme indicated by the stored downstream modulation scheme information. It is to be noted that if the modulation level of the modulation scheme has been changed, the amount of data modulated in a signal is also changed even if the amount of the signal has not been changed. Therefore, the transmission data multiplexing unit 101 and the reception data extraction unit 110 changes the data size of the target data to be handled in accordance with the modulation scheme at the timing when the first modulation unit 103a switches the modulation scheme. That concludes the description of an example of the timing when the first modulation unit 103a switches the modulation scheme, and the description returns to that of the structure of the communication apparatus 10.

The first RF unit 104a receives the signal in which the synchronization patterns are embedded from the first modulation unit 103a, and performs a transmission process such as upconversion. Then, in the case of FIG. 1, the first RF unit 104a of the communication apparatus 10 transmits a signal by radio to a first RF unit 204a of the opposed communication apparatus 20.

Moreover, in the case of FIG. 1, the first RF unit 104a of the communication apparatus 10 receives a signal by radio from the first RF unit 204a of the opposed communication apparatus 20. Then, the first RF unit 104a performs a reception process such as downconversion on the received signal, and sends the resultant signal to the first demodulation unit 105a.

The second modulation scheme information multiplexing unit 102b performs the same process as that of the first modulation scheme information multiplexing unit 102a to generate multiplexed transmission data. Then, the second modulation scheme information multiplexing unit 102b sends the multiplexed transmission data to the second modulation unit 103b.

The second modulation unit 103b performs the same process as that of the first modulation unit 103a. That is, the second modulation unit 103b performs a modulation process on the multiplexed transmission data received from the second modulation scheme information multiplexing unit 102b. Then, the second modulation unit 103b sends a modulated signal to the second RF unit 104b.

The second RF unit 104b performs the same process as that of the first RF unit 104a. That is, the second RF unit 104b receives the modulated signal from the second modulation unit 103b, and performs a transmission process such as upconversion. Then, in the case of FIG. 1, the second RF unit 104b of the communication apparatus 10 transmits a signal by radio to a second RF unit 204b of the opposed communication apparatus 20.

Moreover, in the case of FIG. 1, the second RF unit 104b of the communication apparatus 10 receives a signal by radio from the second RF unit 204b of the opposed communication apparatus 20. The second RF unit 104b performs a reception process such as downconversion on the received signal, and sends to the second demodulation unit 105b.

The first RF unit 104a, the first demodulation unit 105a, and the first modulation scheme information extraction unit 107a, and the second RF unit 104b, the second demodulation unit 105b, and the second modulation scheme information extraction unit 107b form separate reception channels. Each reception channel performs the same process on the received signal. Hereinafter, the other structures among the structures that form the reception channels other than the first RF unit 104a and the second RF unit 104b, which have already been described, will be described.

The first demodulation unit 105a performs a demodulation process on the received signal. As a result of the demodulation process, the first demodulation unit 105a restores multiplexed transmission data transmitted from the communication apparatus 20. The first demodulation unit 105a detects synchronization patterns from the restored multiplexed transmission data, and determines delimiters between frames. The first demodulation unit 105a sends the restored multiplexed transmission data to the first modulation scheme information extraction unit 107a.

Moreover, the first demodulation unit 105a generates information indicating the line quality of the upstream communication between the first RF unit 104a of the apparatus itself (the communication apparatus 10) and the first RF unit 204a of the opposed apparatus (the communication apparatus 20) based on the received signal. Hereinafter, information indicating the line quality of communication is referred to as "line quality information". The line quality information may be any information as long as the modulation scheme determination unit 106 can perform a process in accordance with an adaptive modulation method. The first demodulation unit 105a generates the line quality information at predetermined timings. A predetermined timing may be a predetermined time, it may be a timing when a synchronization pattern has been detected, or it may be another timing. The first demodulation unit 105a notifies the modulation scheme determination unit 106 and the line switching determination unit 108 of the generated line quality information.

Moreover, the first demodulation unit 105a detects the occurrence of a line disconnection in the upstream communication between the first RF unit 104a of the apparatus itself (the communication apparatus 10) and the first RF unit 204a of the opposed apparatus (the communication apparatus 20) based on the received signal. The line disconnection refers to the state in which normal communication is impossible, that is, the state in which signals transmitted from the opposed apparatus (the communication apparatus 20) cannot be received correctly. The first demodulation unit 105a may detect the occurrence of the line disconnection using any technology. For example, the first demodulation unit 105a may detect the occurrence of the line disconnection based on synchronization patterns. More specifically, the first demodulation unit 105a may determine that the line disconnection has occurred if the next synchronization pattern cannot be detected after a predetermined time has elapsed since the previous synchronization pattern was detected. Upon detection of the occurrence of the line disconnection, the first demodulation unit 105a notifies the modulation scheme determination unit 106 of the occurrence of the line disconnection. Moreover, when the line disconnection has occurred, the first demodulation unit 105a does not perform a demodulation process, so that the multiplexed transmission data is not restored.

Here, an example of the timing when the first demodulation unit 105a switches the modulation scheme will be described. The first demodulation unit 105a receives a notification of the upstream modulation scheme information from the first modulation scheme information extraction unit 107a, and stores the information. The first demodulation unit 105a demodulates the signal received by the first RF unit 104a, and if a synchronization pattern has been detected, the first demodulation unit 105a starts a demodulation process with the modulation scheme of which it was previously notified by the first modulation scheme information extraction unit 107a.

For example, in an example of the upstream communication, a first modulation unit 203a and the first demodulation unit 105a switch their modulation scheme at the aforementioned timing, so that the modulation scheme can be switched without an instantaneous interruption. That concludes the description of an example of the timing when the first demodulation unit 105a switches the modulation scheme, and the description returns to that of the structure of the communication apparatus 10.

The modulation scheme determination unit 106 receives a notification of line quality information and the occurrence of a line disconnection from each of the first demodulation unit 105a and the second demodulation unit 105b. Then, the modulation scheme determination unit 106 determines the modulation scheme (upstream modulation scheme information) to be applied to the upstream communication, based on the two pieces of line quality information and the presence or absence of the occurrence of the line disconnections. The modulation scheme determination unit 106 performs this determination process at predetermined timings. A predetermined timing may be a predetermined time, it may be a timing when the line quality information is notified, or it may be another timing. The modulation scheme determination unit 106 notifies the first modulation scheme information multiplexing unit 102a and the second modulation scheme information multiplexing unit 102b of the determination result (the upstream modulation scheme information).

The first modulation scheme information extraction unit 107a receives the multiplexed transmission data from the first demodulation unit 105a. Moreover, the first modulation scheme information extraction unit 107a extracts the upstream modulation scheme information from the multiplexed transmission data. Then, the first modulation scheme information extraction unit 107a notifies the first demodulation unit 105a and the reception data switching unit 109 of the extracted upstream modulation scheme information.

Furthermore, the first modulation scheme information extraction unit 107a receives a notification of the upstream modulation scheme information from the reception data switching unit 109. If the multiplexed transmission data cannot be received from the first demodulation unit 105a (i.e., when a line disconnection has occurred), the first modulation scheme information extraction unit 107a notifies the first demodulation unit 105a of the upstream modulation scheme information of which it was notified by the reception data switching unit 109.

Additionally, the first modulation scheme information extraction unit 107a sends the multiplexed transmission data to the reception data switching unit 109.

The second demodulation unit 105b performs the same process as that of the first demodulation unit 105a to restore multiplexed transmission data transmitted from the communication apparatus 20. The second demodulation unit 105b sends the restored multiplexed transmission data to the second modulation scheme information extraction unit 107b.

Moreover, the second demodulation unit 105b performs the same process as that of the first demodulation unit 105a to generate line quality information of the upstream communication between the second RF unit 104b of the apparatus itself (the communication apparatus 10) and the second RF unit 204b of the opposed apparatus (the communication apparatus 20). Then, the second demodulation unit 105b notifies the modulation scheme determination unit 106 and the line switching determination unit 108 of the generated line quality information.

Furthermore, the second demodulation unit 105b performs the same process as that of the first demodulation unit 105a to detect the occurrence of a line disconnection in the upstream communication between the second RF unit 104b of the apparatus itself (the communication apparatus 10) and the second RF unit 204b of the opposed apparatus (the communication apparatus 20). Upon detection of the occurrence of the line disconnection, the second demodulation unit 105b notifies the modulation scheme determination unit 106 of the occurrence of the line disconnection. Moreover, when the line disconnection has occurred, the second demodulation unit 105b does not perform a demodulation process, so that the multiplexed transmission data is not restored.

The second modulation scheme information extraction unit 107b receives the multiplexed transmission data from the second demodulation unit 105b. Moreover, the second modulation scheme information extraction unit 107b extracts the upstream modulation scheme information from the multiplexed transmission data. Then, the second modulation scheme information extraction unit 107b notifies the second demodulation unit 105b and the reception data switching unit 109 of the extracted upstream modulation scheme information.

Furthermore, the second modulation scheme information extraction unit 107b receives a notification of the upstream modulation scheme information from the reception data switching unit 109. If the multiplexed transmission data cannot be received from the second demodulation unit 105b (i.e., a line disconnection has occurred), the second modulation scheme information extraction unit 107b notifies the second demodulation unit 105b of the upstream modulation scheme information of which it was notified by the reception data switching unit 109.

Additionally, the second modulation scheme information extraction unit 107b sends the multiplexed transmission data to the reception data switching unit 109.

The line switching determination unit 108 determines which of the multiplexed transmission data demodulated by the first demodulation unit 105a and the multiplexed transmission data demodulated by the second demodulation unit 105b should be adopted. Specifically, the line switching determination unit 108 compares the line quality information received from the first demodulation unit 105a with the line quality information received from the second demodulation unit 105b, and determines a reception channel through which a signal having higher quality has been received.

Then, the line switching determination unit 108 controls the reception data switching unit 109 so that the reception data switching unit 109 outputs the multiplexed transmission data of the reception channel through which the signal having the higher quality has been received.

The reception data switching unit 109 sends, to the reception data extraction unit 110, the multiplexed transmission data of the reception channel through which the signal having the higher quality has been received among the multiplexed transmission data received from the first modulation scheme information extraction unit 107a and the multiplexed transmission data received from the second modulation scheme information extraction unit 107b, in accordance with the control of the line switching determination unit 108. Moreover, the reception data switching unit 109 notifies the first modulation scheme information extraction unit 107a and the second modulation scheme information extraction unit 107b of the upstream modulation scheme information of which it was notified by the reception channel through which the signal having the higher quality was received among the upstream modulation scheme information notified from the first modulation scheme information extraction unit 107a and the upstream modulation scheme information notified from the second modulation scheme information extraction unit 107b.

The reception data extraction unit 110 extracts the downstream modulation scheme information from the multiplexed transmission data received from the reception data switching unit 109. Then, the reception data extraction unit 110 notifies the transmission data multiplexing unit 101 of the extracted downstream modulation scheme information. Moreover, the reception data extraction unit 110 removes the upstream modulation scheme information and the downstream modulation scheme information from the multiplexed transmission data to restore target data. Then, the reception data extraction unit 110 outputs the restored target data. The output destination of the target data may be an information processing function provided in the communication apparatus 10, or it may be another information processing apparatus connected to the communication apparatus 10.

Figure 2:
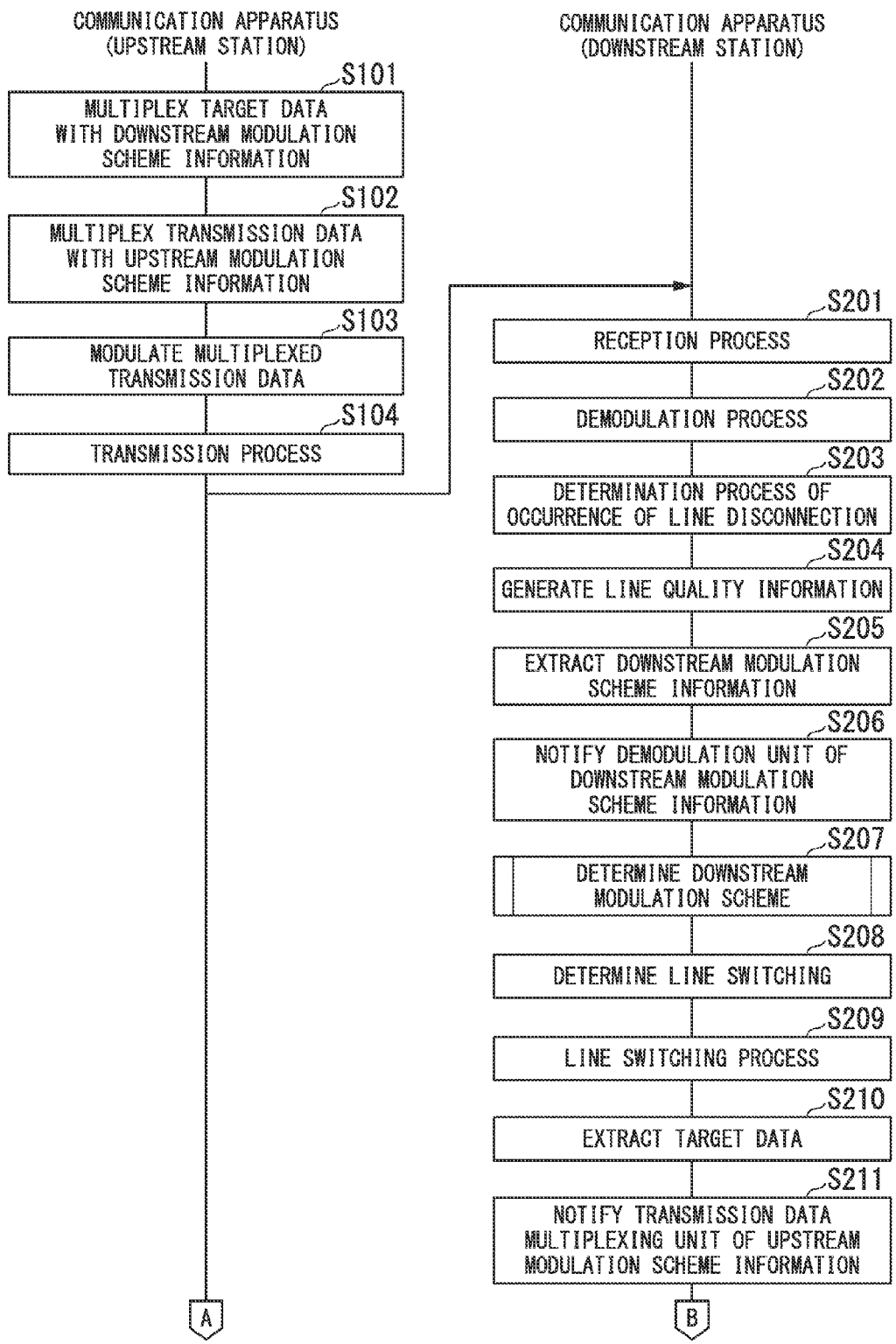
FIG. 2 is a sequence diagram illustrating a flow of an operation of the communication system.
Figure 3:
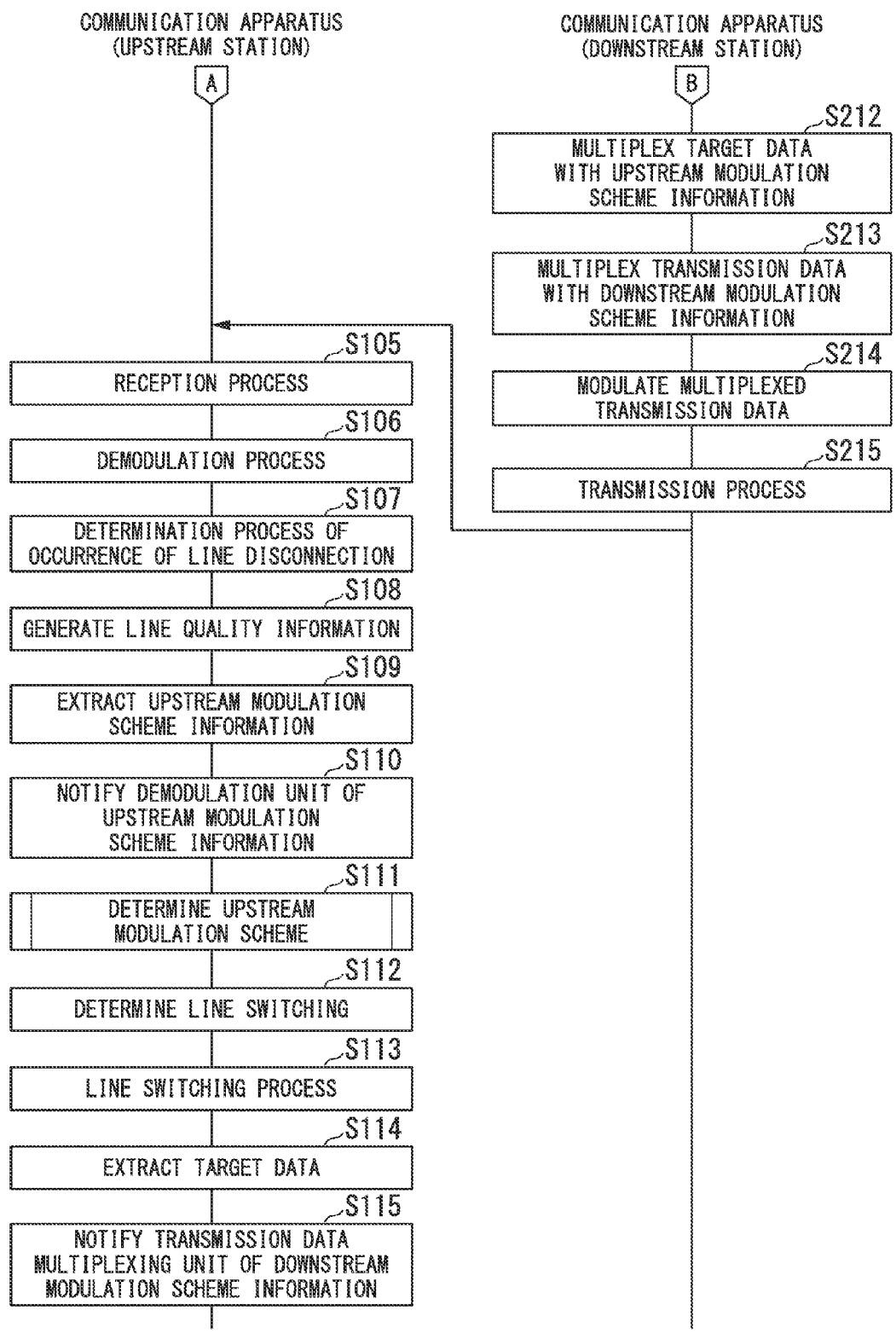
FIG. 3 is a sequence diagram illustrating a flow of an operation of the communication system.

FIG. 2 and FIG. 3 are sequence diagrams illustrating a flow of an operation of the communication system 1. Actually, the processing is not performed on a frame-by-frame basis, and a multiplexing process of downstream modulation scheme information, a multiplexing process of upstream modulation scheme information, a determination process of the occurrence of a line disconnection, a generation process of line quality information, a determination process of a modulation scheme, a line switching process, and the like are performed at predetermined timings while target data is continuously modulated and transmitted. However, for convenience of the description, FIG. 2 and FIG. 3 illustrate an example of a configuration in which the foregoing processes are performed once per frame, and a description will be given by sequentially reciting the processes that are performed in a period from the start of transmission of one frame to the end of the transmission. Therefore, the order of the processes is not limited to that illustrated in FIG. 2 and FIG. 3. For example, the order of the process of S101 and the process of S102 may be reversed.

The transmission data multiplexing unit 101 multiplexes target data with downstream modulation scheme information (step S101). This downstream modulation scheme information is information that has been multiplexed with multiplexed transmission data transmitted from the communication apparatus 20, and it indicates a modulation scheme determined by a modulation scheme determination unit 206 of the communication apparatus 20. The first modulation scheme information multiplexing unit 102a and the second modulation scheme information multiplexing unit 102b multiplex transmission data with upstream modulation scheme information (step S102). This upstream modulation scheme information indicates a modulation scheme determined by the modulation scheme determination unit 106 of the apparatus itself (the communication apparatus 10). Subsequently, the first modulation unit 103a and the second modulation unit 103b extract the downstream modulation scheme information from the multiplexed transmission data and store the information. The first modulation unit 103a and the second modulation unit 103b modulate the multiplexed transmission data (step S103). Subsequently, the first RF unit 104a performs a transmission process on a signal modulated by the first modulation unit 103a to perform transmission. In addition, the second RF unit 104b performs a transmission process on a signal modulated by the second modulation unit 103b to perform transmission (step S104).

The first RF unit 204a receives a signal by radio from the first RF unit 104a and performs a reception process, and the second RF unit 204b receives a signal by radio from the second RF unit 104b and performs a reception process (step S201). A first demodulation unit 205a performs a demodulation process on the signal received by the first RF unit 204a to restore multiplexed transmission data. A second demodulation unit 205b performs a demodulation process on the signal received by the second RF unit 204b to restore multiplexed transmission data (step S202). Moreover, the first demodulation unit 205a and the second demodulation unit 205b determine the occurrence of a line disconnection (step S203). When the occurrence of the line disconnection has been detected, the first demodulation unit 205a and the second demodulation unit 205b notify the modulation scheme determination unit 206 of the occurrence of the line disconnection. Moreover, the first demodulation unit 205a and the second demodulation unit 205b generate line quality information and notify the modulation scheme determination unit 206 and a line switching determination unit 208 of the information (step S204).

A first modulation scheme information extraction unit 207a and a second modulation scheme information extraction unit 207b extract the downstream modulation scheme information from the restored multiplexed transmission data (step S205). Then, the first modulation scheme information extraction unit 207a notifies the first demodulation unit 205a of the extracted downstream modulation scheme information. Moreover, the second modulation scheme information extraction unit 207b notifies the second demodulation unit 205b of the extracted downstream modulation scheme information (step S206). The modulation scheme determination unit 206 determines the downstream modulation scheme information (step S207). Moreover, the line switching determination unit 208 determines the switching of a line (step S208). That is, the line switching determination unit 208 determines which of the multiplexed transmission data restored by the first demodulation unit 205a and the multiplexed transmission data restored by the second demodulation unit 205b should be adopted. Then, a reception data switching unit 209 performs a line switching process in accordance with the determination result of the line switching determination unit 208 (step S209). That is, the reception data switching unit 209 outputs, to a reception data extraction unit 210, the multiplexed transmission data to be adopted that has been determined by the line switching determination unit 208. The reception data extraction unit 210 receives the multiplexed transmission data from the reception data switching unit 209 and extracts the upstream modulation scheme information. Moreover, the reception data extraction unit 210 removes the upstream modulation scheme information and the downstream modulation scheme information from the multiplexed transmission data to restore target data, and outputs the restored target data (step S210). Moreover, the reception data extraction unit 210 notifies a transmission data multiplexing unit 201 of the upstream modulation scheme information (step S211).

Upon receipt of a notification of the upstream modulation scheme information from the reception data extraction unit 210, the transmission data multiplexing unit 201 multiplexes target data with the upstream modulation scheme information (step S212). A first modulation scheme information multiplexing unit 202a and a second modulation scheme information multiplexing unit 202b multiplex transmission data with the downstream modulation scheme information (step S213). The first modulation unit 203a and a second modulation unit 203b modulate the multiplexed transmission data (step S214). Subsequently, the first RF unit 204a performs a transmission process on a signal modulated by the first modulation unit 203a to perform transmission. Moreover, the second RF unit 204b performs a transmission process on a signal modulated by the second modulation unit 203b to perform transmission (step S215).

The first RF unit 104a receives a signal by radio from the first RF unit 204a and performs a reception process, and the second RF unit 104b receives a signal by radio from the second RF unit 204b and performs a reception process (step S105). The first demodulation unit 105a performs a demodulation process on the signal received by the first RF unit 104a to restore multiplexed transmission data. The second demodulation unit 105b performs a demodulation process on the signal received by the second RF unit 104b to restore multiplexed transmission data (step S106). Moreover, the first demodulation unit 105a and the second demodulation unit 105b determine the occurrence of a line disconnection (step S107). If the occurrence of the line disconnection has been detected, the first demodulation unit 105a and the second demodulation unit 105b notify the modulation scheme determination unit 106 of the occurrence of the line disconnection. Furthermore, the first demodulation unit 105a and the second demodulation unit 105b generate line quality information and notify the modulation scheme determination unit 106 and the line switching determination unit 108 of the information (step S108).

The first modulation scheme information extraction unit 107a and the second modulation scheme information extraction unit 107b extract the upstream modulation scheme information from the restored multiplexed transmission data (step S109). Then, the first modulation scheme information extraction unit 107a notifies the first demodulation unit 105a of the extracted upstream modulation scheme information. Moreover, the second modulation scheme information extraction unit 107b notifies the second demodulation unit 105b of the extracted upstream modulation scheme information (step S110). The modulation scheme determination unit 106 determines the upstream modulation scheme information (step S111). Moreover, the line switching determination unit 108 determines the switching of a line (step S112). That is, the line switching determination unit 108 determines which of the multiplexed transmission data restored by the first demodulation unit 105a and the multiplexed transmission data restored by the second demodulation unit 105b should be adopted. Then, the reception data switching unit 109 performs a line switching process based on the determination result of the line switching determination unit 108 (step S113). That is, the reception data switching unit 109 outputs, to the reception data extraction unit 110, the multiplexed transmission data to be adopted that has been determined by the line switching determination unit 108. The reception data extraction unit 110 receives the multiplexed transmission data from the reception data switching unit 109 and extracts the downstream modulation scheme information. Moreover, the reception data extraction unit 110 removes the downstream modulation scheme information and the upstream modulation scheme information from the multiplexed transmission data to restore target data, and outputs the restored target data (step S114). Moreover, the reception data extraction unit 110 notifies the transmission data multiplexing unit 101 of the downstream modulation scheme information (step S115). Thereafter, the processing returns to step S101 of FIG. 2.

Figure 4:
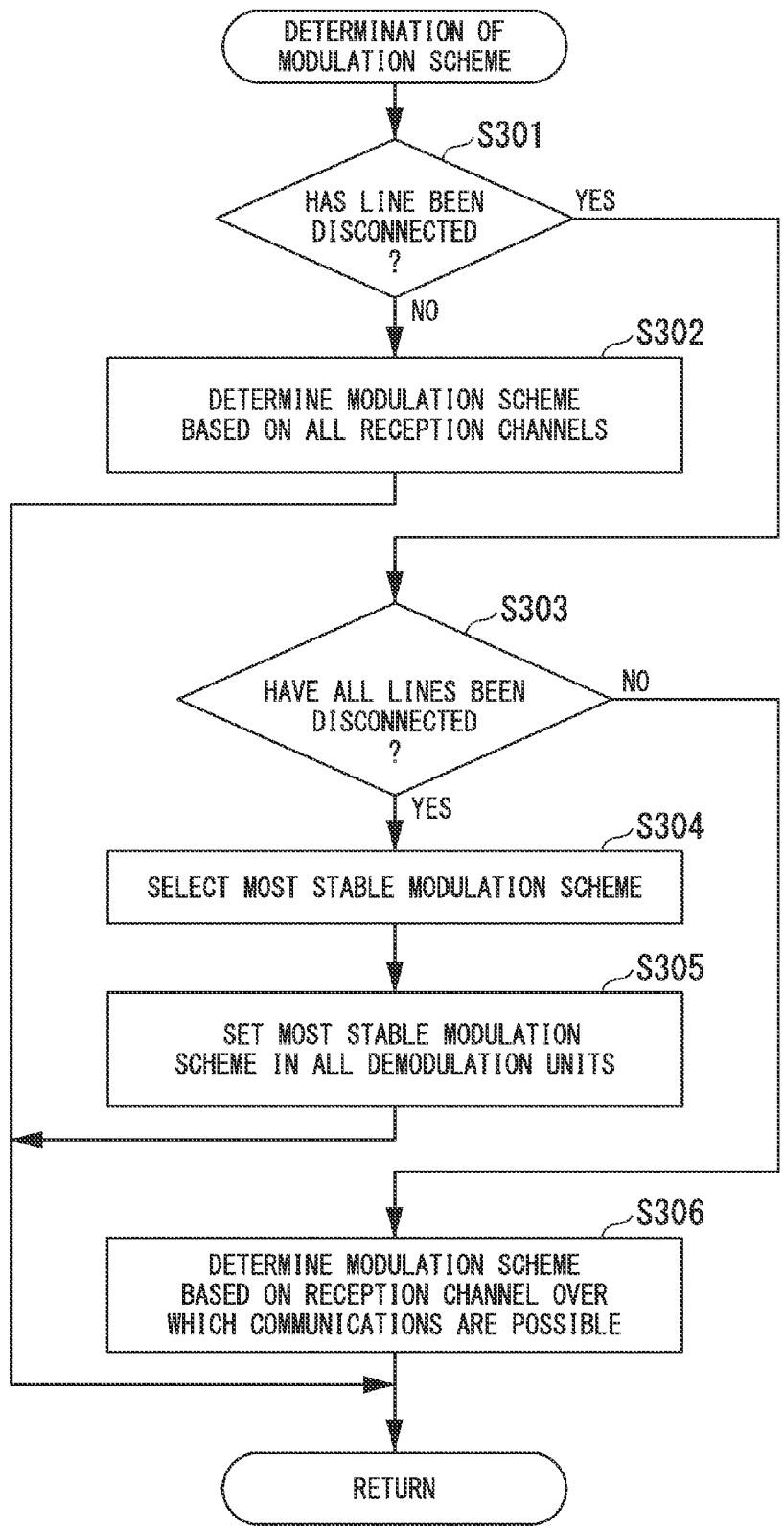
FIG. 4 is a flowchart illustrating a flow of a process in a modulation scheme determination unit.

FIG. 4 is a flowchart illustrating a flow of processes in the modulation scheme determination unit 106 and the modulation scheme determination unit 206. The processes illustrated in the flowchart of FIG. 4 correspond to the process in S207 of FIG. 2 and the process in S111 of FIG. 3. Hereinafter, the flowchart illustrated in FIG. 4 will be described using an example of the process in the modulation scheme determination unit 106. First, the modulation scheme determination unit 106 determines whether or not a line disconnection has occurred in wireless communication in the first RF unit 104a or wireless communication in the second RF unit 104b (step S301).

If no line disconnection has occurred (step S301-NO), the modulation scheme determination unit 106 determines a modulation scheme based on all the reception channels (step S302). Specifically, the modulation scheme determination unit 106 determines a modulation scheme based on line quality information received from the first demodulation unit 105a and line quality information received from the second demodulation unit 105b. Hereinafter, a specific example of the determination process of the modulation scheme will be described. First, the modulation scheme determination unit 106 selects a modulation scheme in accordance with an adaptive modulation method based on the line quality information received from the first demodulation unit 105a. Moreover, the modulation scheme determination unit 106 selects a modulation scheme in accordance with an adaptive modulation method based on the line quality information received from the second demodulation unit 105b. Also, the modulation scheme determination unit 106 may select a more stable modulation scheme among the selected two modulation schemes. The more stable modulation scheme is, for example, a modulation scheme having a smaller modulation level.

If line disconnections have occurred in all the lines (the line P3 and the line P4) (step S301-YES and step S303-YES), the modulation scheme determination unit 106 selects the most stable modulation scheme (step S304). The most stable modulation scheme is, for example, a modulation scheme having the smallest modulation level. Moreover, the modulation scheme determination unit 106 controls all the demodulation units (the first demodulation unit 105a and the second demodulation unit 105b) so that demodulation processes with the most stable modulation scheme are performed (step 305).

If a line disconnection has occurred in either one of the lines (the line P3 or the line P4) (step S301-YES and step S303-NO), the modulation scheme determination unit 106 determines a modulation scheme based on a reception channel in which no line disconnection has occurred (step S306). Specifically, the modulation scheme determination unit 106 selects a modulation scheme in accordance with an adaptive modulation method based on the line quality information received from the demodulation unit (the first demodulation unit 105a or the second demodulation unit 105b) of the reception channel in which no line disconnection has occurred.

After the modulation scheme determination unit 106 has performed the process in step S302, S305, or S306, the process illustrated in the flowchart of FIG. 4 is completed.

Figure 5:
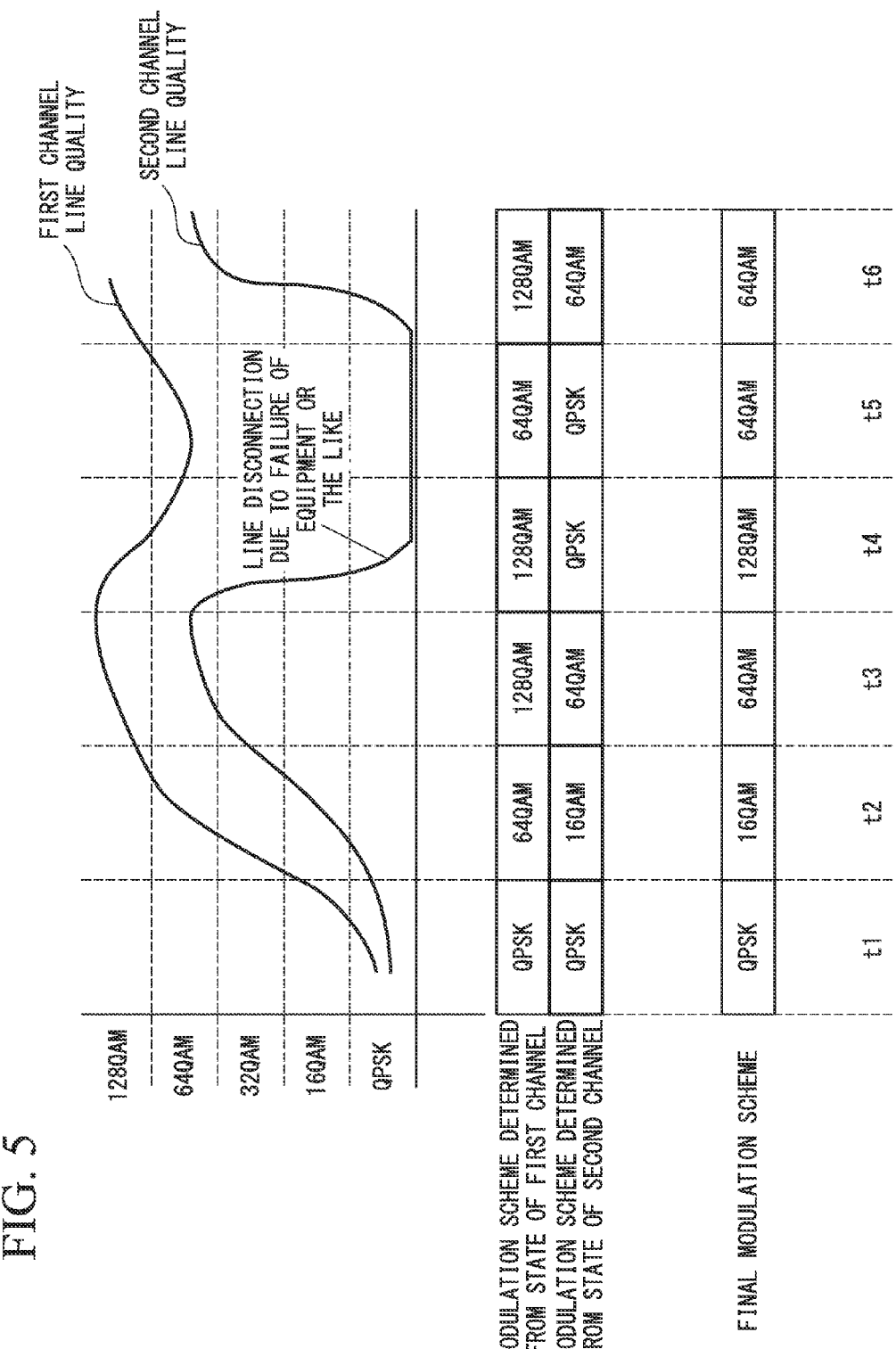
FIG. 5 is a diagram illustrating a specific example of the process in the modulation scheme determination unit.

FIG. 5 is a diagram illustrating a specific example of the process in the modulation scheme determination unit 106. In FIG. 5, a first channel line represents a line (the line P3) of the upstream communication between the first RF unit 104a and the first RF unit 204a. A second channel line represents a line (the line P4) of the upstream communication between the second RF unit 104b and the second RF unit 204b. First, a process when no line disconnection has occurred in all the lines will be described. In this case, the modulation scheme determination unit 106 selects a modulation scheme having a smaller number of levels among a modulation scheme determined based on the quality of the first channel line (first channel line quality) and a modulation scheme determined based on the quality of the second channel line (second channel line quality).

When the modulation scheme determined based on the first channel line quality is QPSK (quadrature phase shift keying) and the modulation scheme determined based on the second channel line quality is also QPSK, the modulation scheme determination unit 106 selects QPSK (t1). When the modulation scheme determined based on the first channel line quality is 64 QAM (quadrature amplitude modulation) and the modulation scheme determined based on the second channel line quality is 16 QAM, the modulation scheme determination unit 106 selects 16 QAM having a smaller number of levels (t2). When the modulation scheme based on the first channel line quality is 128 QAM and the modulation scheme determined based on the second channel line quality is 64 QAM, the modulation scheme determination unit 106 selects 64 QAM having a smaller number of levels (t3).

Next, a process when a line disconnection has occurred in the second channel line will be described. In this case, the modulation scheme determination unit 106 selects a modulation scheme based on the quality of the first channel line, in which no line disconnection has occurred. Moreover, in this case, the modulation scheme determined based on the quality of the second channel line, in which the line disconnection has occurred, is QPSK having the smallest number of levels. When the modulation scheme determined based on the first channel line quality is 128 QAM, the modulation scheme determination unit 106 selects 128 QAM (t4). When the modulation scheme determined based on the first channel line quality is 64 QAM, the modulation scheme determination unit 106 selects 64 QAM (t5).

Next, a process when the second channel line has been restored after the line disconnection occurred in the second channel line will be described. In this case, the modulation scheme determination unit 106 operates in the same manner as the case in which no line disconnection has occurred in all the lines. That is, the modulation scheme determination unit 106 selects a modulation scheme having a smaller number of levels among the modulation scheme determined based on the first channel line quality and the modulation scheme determined based on the second channel line quality. When the modulation scheme determined based on the first channel line quality is 128 QAM and the modulation scheme determined based on the second channel line quality is 64 QAM, the modulation scheme determination unit 106 selects 64 QAM (t6).

In the communication system 1, data of the same content is transmitted or received over a plurality of lines. Therefore, it is possible to realize wireless communication that provides the redundancy, and it is possible to increase the availability for failures that occur in the lines. Moreover, when communication is possible over all the lines (when no line disconnection has occurred), a modulation scheme is determined based on an adaptive modulation method. Therefore, when communication is possible over all the lines, a suitable modulation scheme depending on the states of the lines is selected, and thus it is possible to efficiently perform wireless communication. In contrast, when it becomes impossible to perform communication over one of the lines (the state in which a line is disconnected), a modulation scheme is determined based on the lines over which communication is possible. Thus, a modulation scheme is determined based on only line quality information of the lines over which communication is possible, irrespective of the line quality information of the line in which the line disconnection has occurred. Therefore, it is possible to prevent the modulation schemes of the lines over which communication is possible from being determined as a modulation scheme that provides the poor transmission efficiency than the transmission efficiencies of the modulation schemes that should originally be selected based on the line quality information of these lines. That is, it is possible to prevent the transmission efficiency from being reduced even if it becomes impossible to perform communication over one of the lines.

Moreover, in the communication system 1, even if a line disconnection has occurred in the upstream communication of one of the lines and a line disconnection has occurred in the downstream communication of the other line, the transmission efficiency is not reduced, and it is possible to continue wireless communication. That is, as a result of the above-described process, even if a line disconnection has occurred in the upstream communication of one of the lines, a suitable modulation scheme is determined based on the upstream communication of the line in which no line disconnection has occurred. Moreover, as a result of the above-described process, even if a line disconnection has occurred in the downstream communication of the other line, a suitable modulation scheme is determined based on the downstream communication of the line in which no line disconnection has occurred.

VARIANT EXAMPLE

Figure 6:
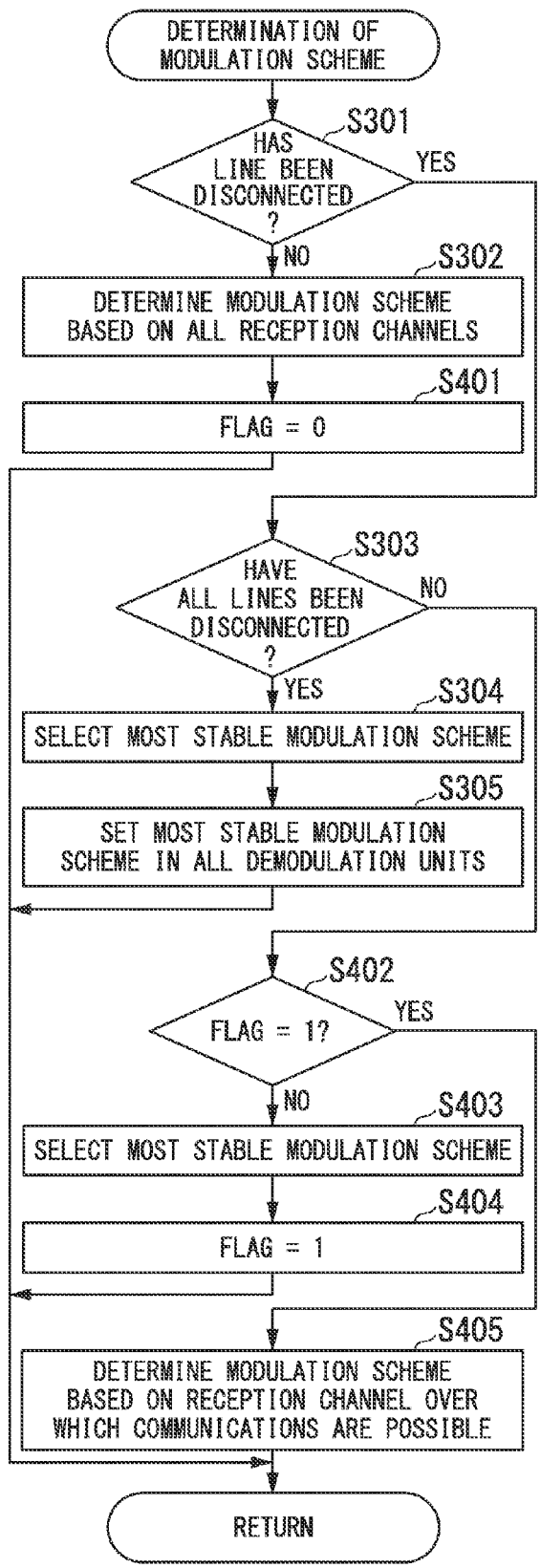
FIG. 6 is a flowchart illustrating a flow of a process in a variant example of the modulation scheme determination unit.

FIG. 6 is a flowchart illustrating a flow of a process in accordance with a variant example of the modulation scheme determination unit 106 and the modulation scheme determination unit 206. Hereinafter, the flowchart illustrated in FIG. 6 will be described with respect to an example of a process of the modulation scheme determination unit 106. In FIG. 6, the same reference symbols are assigned to the same processes as those of FIG. 4, and their description will be omitted.

In the process of FIG. 6, the modulation scheme determination unit 106 performs the process using a variable, i.e., a flag. The flag represents whether or not the state in which a line disconnection has occurred in part of lines continues. When no line disconnection has occurred in the part of the lines or immediately after a line disconnection has occurred in the part of the lines, the value of the flag is "0". In contrast, when a line disconnection in the part of the lines continues, the value of the flag is "1". "Immediately after a line disconnection has occurred in the part of the lines" means the state in which a determination of the modulation scheme by the modulation scheme determination unit 106 has never been performed after the line disconnection has occurred in the part of the lines. "When a line disconnection in the part of the lines continues" means the state in which the line disconnection continues in the part of the lines and a determination of the modulation scheme by the modulation scheme determination unit 106 has been performed at least once while the line disconnection continues.

If no line disconnection has occurred (step S301-NO), the modulation scheme determination unit 106 determines a modulation scheme based on all the reception channels (step S302). Then, the modulation scheme determination unit 106 substitutes "0" for the flag (step S401).

If line disconnections have occurred in all the lines (step S301-YES and step S303-YES), the modulation scheme determination unit 106 operates in the same manner as in the case of FIG. 4.

If a line disconnection has occurred in the part of the lines (step S301-YES and step S303-NO), the modulation scheme determination unit 106 determine whether or not the current value of the flag is "1" (step S402). If the current value of the flag is "0" (step S402-NO), the modulation scheme determination unit 106 selects the most stable modulation scheme (step S403). Then, the modulation scheme determination unit 106 substitutes "1" for the flag (step S404).

In contrast, if the current value of the flag is "1" (step S402-YES), the modulation scheme determination unit 106 determines a modulation scheme based on the reception channel over which communication is possible (step S405). Specifically, the modulation scheme determination unit 106 selects a modulation scheme in accordance with an adaptive modulation method based on line quality information received from a demodulation unit (the first demodulation unit 105a or the second demodulation unit 105b) of the reception channel in which no line disconnection has occurred. In the process of step S405, if the difference in transmission efficiency between the currently selected modulation scheme and the modulation scheme selected based on the line quality information received from the demodulation unit (the first demodulation unit 105a or the second demodulation unit 105b) of the reception channel in which no line disconnection has occurred corresponds to a plurality of steps, the modulation scheme determination unit 106 may switch the modulation scheme in a stepwise manner. For example, when the currently selected modulation scheme is QPSK and the modulation scheme selected based on the line quality information received from the demodulation unit (the first demodulation unit 105a or the second demodulation unit 105b) of the reception channel in which no line disconnection has occurred is 64 QAM, the modulation scheme determination unit 106 may select 16 QAM first, in which the number of levels thereof is between those of the two modulation schemes. Then, in a determination of a modulation scheme in the next cycle, if the currently selected modulation scheme is 16 QAM and the modulation scheme selected based on the line quality information received from the demodulation unit (the first demodulation unit 105a or the second demodulation unit 105b) of the reception channel in which no line disconnection has occurred is 64 QAM, the modulation scheme determination unit 106 may select 64 QAM.

In the communication system 1 thus configured, if a line disconnection has occurred in part of the lines, the most stable modulation scheme is selected first, and then a modulation scheme is determined based on the reception channel over which communication is possible.

Another Variant Example

Instead of sending multiplexed transmission data to the reception data switching unit 109, the first modulation scheme information extraction unit 107a may remove upstream modulation scheme information from the multiplexed transmission data to restore transmission data and may send the transmission data to the reception data switching unit 109. This can be applied to the second modulation scheme information extraction unit 107b, the first modulation scheme information extraction unit 207a, and the second modulation scheme information extraction unit 207b.

As described above, although an exemplary embodiment of the present invention has been described in detail with reference to the drawings, the specific configuration is not limited to the exemplary embodiment, and design or the like that does not depart from the gist of the present invention can also be included.

INDUSTRIAL APPLICABILITY

The present invention can be used, for example, in communication that switches a modulation scheme in accordance with an adaptive modulation method. The present invention can prevent the transmission efficiency in a communication apparatus that performs wireless communication over a plurality of lines from being reduced.

DESCRIPTION OF REFERENCE SYMBOLS

1 communication system
10, 20 communication apparatus
101, 201 transmission data multiplexing unit
102a, 202a first modulation scheme information multiplexing unit (transmission unit)
102b, 202b second modulation scheme information multiplexing unit (transmission unit)
103a, 203a first modulating unit (transmission unit)
103b, 203b second modulating unit (transmission unit)
104a, 204a first RF unit (reception unit, transmission unit)
104b, 204b second RF unit (reception unit, transmission unit)
105a, 205a first demodulation unit (quality determination unit, line disconnection detection unit)
105b, 205b second demodulation unit (quality determination unit, line disconnection detection unit)
106, 206 modulation scheme determination unit
107a, 207a first modulation scheme information extraction unit
107b, 207b second modulation scheme information extraction unit
108, 208 line switching determination unit
109, 209 reception data switching unit
110, 210 reception data extraction unit

The invention claimed is:
1. A communication apparatus comprising:
a plurality of reception units which receive signals from an opposed station over a plurality of lines that perform wireless communication simultaneously;
a quality determination unit which determines qualities of the plurality of lines based on the received signals;
a modulation scheme determination unit which determines a modulation scheme to be used for the wireless communication based on the quality of only a line over which communication is possible when it becomes impossible to perform communication over a line among the plurality of lines that perform wireless communication simultaneously; and a transmission unit which transmits information indicating the determined modulation scheme to the opposed station, wherein a flag has a first value when no line disconnection has occurred in part of the lines or immediately after a line disconnection has occurred in the part of the lines, and has a second value when a line disconnection in the part of the lines continues, and wherein when line disconnection has occurred in all of the plurality of lines and the flag has the first value, the modulation scheme determination unit selects the most stable modulation scheme, and sets the flag to be the second value.

2. The communication apparatus according to claim 1, wherein when communication is possible over all the plurality of lines, the modulation scheme determination unit determines the modulation scheme to be used for the wireless communication based on the qualities of all the lines.

3. The communication apparatus according to claim 2, further comprising a line disconnection detection unit which detects that it becomes impossible to perform communication for each line.

4. The communication apparatus according to claim 3, wherein when communication over all the lines is impossible, the modulation scheme determination unit determines the most stable modulation scheme among selectable modulation schemes, as the modulation scheme to be used for the wireless communication.

5. The communication apparatus according to claim 4, wherein immediately after it becomes impossible to perform the communication over the line among the lines, the modulation scheme determination unit determines the most stable modulation scheme as the modulation scheme to be used for the wireless communication irrespective of the quality of the line over which the communication is possible, and thereafter the modulation scheme determination unit determines the modulation scheme to be used for the wireless communication from the opposed station to a station itself based on only the quality of the line over which the communication is possible until communication over the line over which the communication is impossible becomes possible.

6. The communication apparatus according to claim 5, wherein when the modulation scheme is determined based on only the quality of the line over which the communication is possible until communication over the line over which the communication is impossible becomes possible, the modulation scheme determination unit selects the modulation scheme so that the modulation scheme to be used for the wireless communication from the opposed station to the station itself is switched in a stepwise manner.

7. The communication apparatus according to claim 3, wherein immediately after it becomes impossible to perform the communication over the line among the lines, the modulation scheme determination unit determines the most stable modulation scheme as the modulation scheme to be used for the wireless communication irrespective of the quality of the line over which the communication is possible, and thereafter the modulation scheme determination unit determines the modulation scheme to be used for the wireless communication from the opposed station to a station itself based on only the quality of the line over which the communication is possible until communication over the line over which the communication is impossible becomes possible.

8. The communication apparatus according to claim 7, wherein when the modulation scheme is determined based on only the quality of the line over which the communication is possible until communication over the line over which the communication is impossible becomes possible, the modulation scheme determination unit selects the modulation scheme so that the modulation scheme to be used for the wireless communication from the opposed station to the station itself is switched in a stepwise manner.

9. The communication apparatus according to claim 2, wherein when communication over all the lines is impossible, the modulation scheme determination unit determines the most stable modulation scheme among selectable modulation schemes, as the modulation scheme to be used for the wireless communication.

10. The communication apparatus according to claim 9, wherein immediately after it becomes impossible to perform the communication over the line among the lines, the modulation scheme determination unit determines the most stable modulation scheme as the modulation scheme to be used for the wireless communication irrespective of the quality of the line over which the communication is possible, and thereafter the modulation scheme determination unit determines the modulation scheme to be used for the wireless communication from the opposed station to a station itself based on only the quality of the line over which the communication is possible until communication over the line over which the communication is impossible becomes possible.

11. The communication apparatus according to claim 10, wherein when the modulation scheme is determined based on only the quality of the line over which the communication is possible until communication over the line over which the communication is impossible becomes possible, the modulation scheme determination unit selects the modulation scheme so that the modulation scheme to be used for the wireless communication from the opposed station to the station itself is switched in a stepwise manner.

12. The communication apparatus according to claim 2, wherein immediately after it becomes impossible to perform the communication over the line among the lines, the modulation scheme determination unit determines the most stable modulation scheme as the modulation scheme to be used for the wireless communication irrespective of the quality of the line over which the communication is possible, and thereafter the modulation scheme determination unit determines the modulation scheme to be used for the wireless communication from the opposed station to a station itself based on only the quality of the line over which the communication is possible until communication over the line over which the communication is impossible becomes possible.

13. The communication apparatus according to claim 12, wherein when the modulation scheme is determined based on only the quality of the line over which the communication is possible until communication over the line over which the communication is impossible becomes possible, the modulation scheme determination unit selects the modulation scheme so that the modulation scheme to be used for the wireless communication from the opposed station to the station itself is switched in a stepwise manner.

14. The communication apparatus according to claim 1, further comprising a line disconnection detection unit which detects that it becomes impossible to perform communication for each line.

15. The communication apparatus according to claim 14, wherein when communication over all the lines is impossible, the modulation scheme determination unit determines the most stable modulation scheme among selectable modulation schemes, as the modulation scheme to be used for the wireless communication.

16. The communication apparatus according to claim 15, wherein immediately after it becomes impossible to perform the communication over the line among the lines, the modulation scheme determination unit determines the most stable modulation scheme as the modulation scheme to be used for the wireless communication irrespective of the quality of the line over which the communication is possible, and thereafter the modulation scheme determination unit determines the modulation scheme to be used for the wireless communication from the opposed station to a station itself based on only the quality of the line over which the communication is possible until communication over the line over which the communication is impossible becomes possible.

17. The communication apparatus according to claim 16, wherein when the modulation scheme is determined based on only the quality of the line over which the communication is possible until communication over the line over which the communication is impossible becomes possible, the modulation scheme determination unit selects the modulation scheme so that the modulation scheme to be used for the wireless communication from the opposed station to the station itself is switched in a stepwise manner.

18. The communication apparatus according to claim 14, wherein immediately after it becomes impossible to perform the communication over the line among the lines, the modulation scheme determination unit determines the most stable modulation scheme as the modulation scheme to be used for the wireless communication irrespective of the quality of the line over which the communication is possible, and thereafter the modulation scheme determination unit determines the modulation scheme to be used for the wireless communication from the opposed station to a station itself based on only the quality of the line over which the communication is possible until communication over the line over which the communication is impossible becomes possible.

19. The communication apparatus according to claim 18, wherein when the modulation scheme is determined based on only the quality of the line over which the communication is possible until communication over the line over which the communication is impossible becomes possible, the modulation scheme determination unit selects the modulation scheme so that the modulation scheme to be used for the wireless communication from the opposed station to the station itself is switched in a stepwise manner.

20. The communication apparatus according to claim 1, wherein when communication over all the lines is impossible, the modulation scheme determination unit determines the most stable modulation scheme among selectable modulation schemes, as the modulation scheme to be used for the wireless communication.

21. The communication apparatus according to claim 20, wherein immediately after it becomes impossible to perform the communication over the line among the lines, the modulation scheme determination unit determines the most stable modulation scheme as the modulation scheme to be used for the wireless communication irrespective of the quality of the line over which the communication is possible, and thereafter the modulation scheme determination unit determines the modulation scheme to be used for the wireless communication from the opposed station to a station itself based on only the quality of the line over which the communication is possible until communication over the line over which the communication is impossible becomes possible.

22. The communication apparatus according to claim 21, wherein when the modulation scheme is determined based on only the quality of the line over which the communication is possible until communication over the line over which the communication is impossible becomes possible, the modulation scheme determination unit selects the modulation scheme so that the modulation scheme to be used for the wireless communication from the opposed station to the station itself is switched in a stepwise manner.

23. The communication apparatus according to claim 1, wherein immediately after it becomes impossible to perform the communication over the line among the lines, the modulation scheme determination unit determines the most stable modulation scheme as the modulation scheme to be used for the wireless communication irrespective of the quality of the line over which the communication is possible, and thereafter the modulation scheme determination unit determines the modulation scheme to be used for the wireless communication from the opposed station to a station itself based on only the quality of the line over which the communication is possible until communication over the line over which the communication is impossible becomes possible.

24. The communication apparatus according to claim 23, wherein when the modulation scheme is determined based on only the quality of the line over which the communication is possible until communication over the line over which the communication is impossible becomes possible, the modulation scheme determination unit selects the modulation scheme so that the modulation scheme to be used for the wireless communication from the opposed station to the station itself is switched in a stepwise manner.

25. A communication method comprising:
  receiving signals from an opposed station over a plurality of lines that perform wireless communication simultaneously;
  determining qualities of the plurality of lines based on the received signals;
  determining a modulation scheme to be used for the wireless communication based on the quality of only a line over which communication is possible when communication over a line among the plurality of lines that perform wireless communication simultaneously is impossible; and
  transmitting information indicating the determined modulation scheme to the opposed station,
  wherein a flag has a first value when no line disconnection has occurred in part of the lines or immediately after a line disconnection has occurred in the part of the lines, and has a second value when a line disconnection in the part of the lines continues, and
  wherein when line disconnection has occurred in all of the plurality of lines and the flag has the first value, selecting the most stable modulation scheme, and setting the flag to be the second value.

26. The communication method according to claim 25, wherein in the step of determining the modulation scheme, when communication is possible over all the plurality of lines, the modulation scheme to be used for the wireless communication is determined based on the qualities of all the lines.

* * * * *